No. 621,374. Patented Mar. 21, 1899.
F. RHIND.
LANTERN BRACKET.
(Application filed Jan. 12, 1898.)
(No Model.)
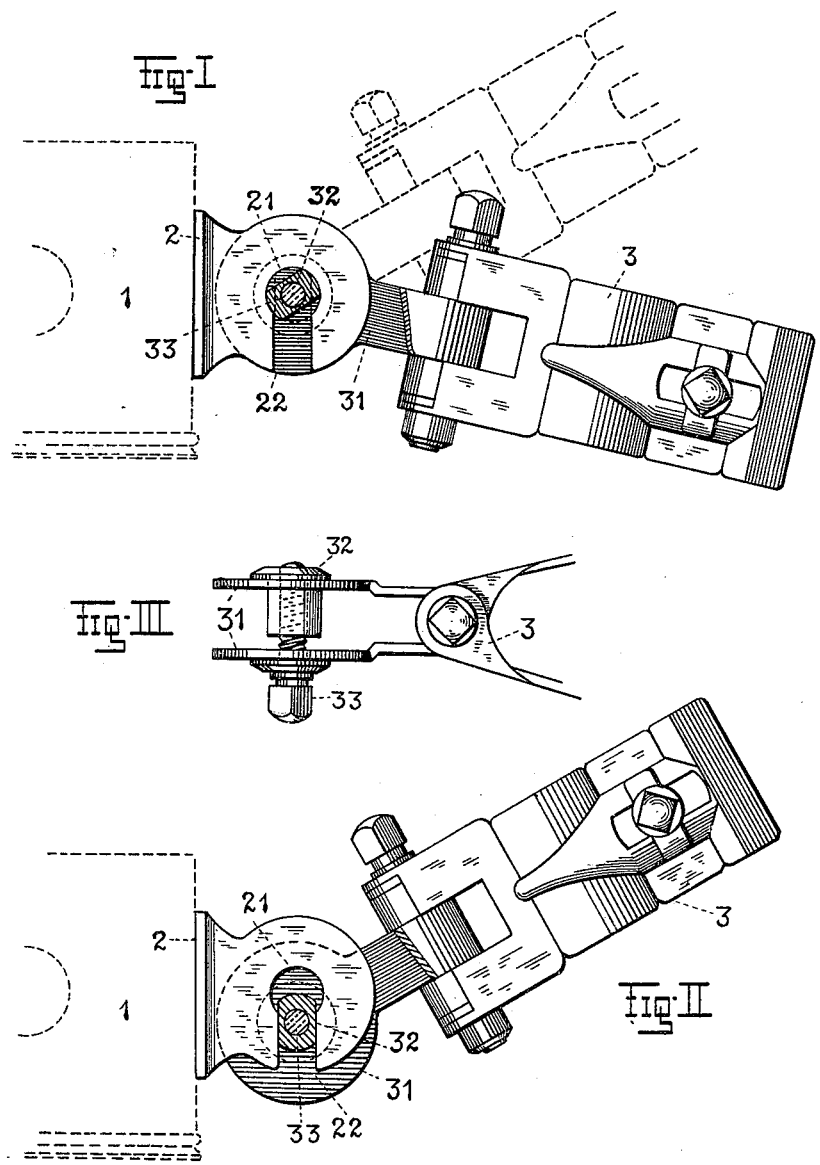
WITNESSES:
INVENTOR
BY
ATTORNEY.

UNITED STATES PATENT OFFICE.

FRANK RHIND, OF BRIDGEPORT, CONNECTICUT, ASSIGNOR OF ONE-HALF TO THE BRIDGEPORT BRASS COMPANY, OF SAME PLACE.

LANTERN-BRACKET.

SPECIFICATION forming part of Letters Patent No. 621,374, dated March 21, 1899.

Application filed January 12, 1898. Serial No. 666,392. (No model.)

*To all whom it may concern:*

Be it known that I, FRANK RHIND, a citizen of the United States, residing at Bridgeport, Connecticut, have invented a new and useful Improvement in Lantern-Brackets, of which the following is a specification.

My invention relates to the class of brackets used to detachably secure a lantern to a cycle or other vehicle. It is intended to facilitate the detachment of such lanterns when desired and to prevent their accidental displacement.

In the accompanying drawings, Figure I represents in elevation, partly broken away, a lantern-bracket embodying my invention in its operative position. Fig. II shows the lantern as being detached from the bracket. Fig. III is a top plan view of a part of the device. Fig. IV shows a modification.

1 designates a lantern-body; 2, a lug formed with central aperture 21 and slot 22; 3, a bracket provided with clamping-plates 31 31, nut 32, and bolt 33.

In the example of my invention illustrated in the drawings only a part of the lantern-body 1 is shown. To the rear of the body 1 is attached the lug 2, the central aperture 21 of which is connected with a radial slot 22 of a width less than the diameter of the aperture 21.

In one of the clamping-plates 31 of the bracket 3 is secured as against rotation, as by soldering or swaging, a nut 32, the width of which adapts it to pass through the slot 22, while its greater diameter is such as to turn smoothly in the aperture 21. A bolt 33 passes through the other plate 31 and engages with the nut 32.

The operation of my device will be readily understood from an inspection of the drawings. It is clear that the clamping-plates 31 31 are either hinged or sufficiently resilient to part, so as to admit the lug 2 between them.

As clearly shown in Figs. I and II of the drawings, the nut 32 can only pass through the slot 22 when the bracket 3 is at a particular angle with the lantern-body 1, and this angle is preferably one which the parts do not assume when the lantern is in use upon a cycle or the like. When the lug 2 is seated between the plates 31 31 and the device in any operative position, the lantern 1 cannot be detached from the bracket 3. The bolt 33 serves, of course, to hold the plates 31 31 against the lug 2. When it is desired to detach the lantern from the cycle, as for cleaning, the bolt 33 is slightly loosened and the lantern tilted to the proper angle, when the lug 2 is easily slipped from between the plates 31 31.

I am aware that many mechanical alterations may be made in the device without departing from my invention.

What I claim is—

1. A lantern-bracket in two parts one of which is integral with or secured to the lantern-body, the other adapted to engagement with a cycle or other vehicle, said parts being provided with means for their pivotal engagement by which they are prevented from disengagement except at a certain point in their relative rotation and means for clamping them at various points in their relative rotation, substantially as described.

2. A lantern-bracket in two parts one of which is integral with or secured to the lantern-body, the other adapted to engagement with a cycle or other vehicle, one of said parts being a lug provided with an aperture and a substantially radial slot leading therefrom, the other part having a portion on which said lug may rotate the less diameter of which portion is adapted to pass through said slot its greater diameter being greater than the width of said slot in combination with means for clamping said parts at various points in their relative rotation, substantially as described.

3. A lantern-bracket in two parts one of which is integral with or secured to the lantern-body, the other adapted to engagement with a cycle or other vehicle, one of said parts having a lug formed with an aperture and a slot leading therefrom, the other part having a plate adapted to bear against said lug in combination with a nut secured as against rotation to said plate said nut having a less diameter adapted to pass through said slot and a greater diameter greater than the width of said slot and a bolt in said nut adapted to clamp said lug to said plate, substantially as described.

4. In a lantern-bracket in combination a lug secured to the lantern-body, a central aperture in said lug, a radial slot in said lug connected with said aperture, a bracket portion adapted to engagement with a cycle or other vehicle and provided with two clamping-plates, a nut the less diameter of which is adapted to pass through said slot its greater diameter being greater than the width of said slot and a clamping-bolt, substantially as described.

FRANK RHIND.

Witnesses:
GEO. L. COOPER,
E. W. TODD.